3,687,626
PROCESS FOR THE PRODUCTION OF
SULFURYL FLUORIDE
Cyril Woole, Morristown, N.J., and Richard O. Michael, Akron, Ohio, assignors to Allied Chemical Corporation, New York, N.Y.
No Drawing. Filed Apr. 2, 1971, Ser. No. 130,799
Int. Cl. C01b 17/45
U.S. Cl. 423—468
6 Claims

ABSTRACT OF THE DISCLOSURE

Sulfuryl fluoride is produced by a process wherein sulfuryl chloride, sulfuryl bromofluoride or sulfuryl chlorofluoride are reacted with ammonium bifluoride at temperatures above the boiling point of said sulfuryl compound reactant.

---

This invention relates to a process for the production of sulfuryl fluoride.

Sulfuryl fluoride ($SO_2F_2$) is a structural fumigant utilized in the control of insect infestations, particularly in stored grain and is usually prepared by a method wherein sulfur dioxide, chlorine and hydrogen fluoride are passed over an activated charcoal catalyst at reaction temperatures ranging from 350° C. to 450° C. The reaction is far from ideal primarily because of low conversion of chlorine and substantial corrosion of reactor materials at the relatively high reaction temperatures employed.

Various attempts have been made in the art to provide a practical alternative to this procedure. For example, it has been proposed to prepare sulfuryl fluoride by reaction of the corresponding chloride with fluorinating agents such as metal fluorides. However, complete fluorination has been achieved in only a few cases with the metal fluorides exhibiting unpredictable effectiveness as fluorinating agents. For example, Wyoski in J.A.C.S., vol. 72, pp. 919 to 921 (1950) discloses the results of attempts to produce sulfuryl fluoride employing various metal fluorides including fluorides of sodium, lithium, potassium, magnesium, calcium and ammonium fluoride. These attempts were totally unsuccessful in liquid phase with reaction occurring only with ammonium fluoride and potassium acid fluoride and then resulting in sulfuryl chlorofluoride ($SO_2ClF$) as the only fluorination product received. In the gas phase, with temperatures of 300–400° C., complete fluorination of sulfuryl chloride was successful only with potassium fluoride with sodium fluoride producing about 5% sulfuryl fluoride. Other fluorides were without effect. In the patent literature, metal fluorides such as cobalt trifluoride, silver difluoride and manganese trifluoride in vapor phase resulted in sulfuryl chlorofluoride as the major product.

We have made the surprising discovery that ammonium bifluoride, $NH_4HF_2$, will react with sulfuryl compounds such as sulfuryl chloride, sulfuryl bromofluoride or sulfuryl chlorofluoride at temperatures above the boiling point of the sulfuryl compound reactant to form a product which is predominantly sulfuryl fluoride.

The results of the instant process are particularly surprising since prior art attempts with other fluorides including ammonium fluoride have been unsuccessful. Additionally, it is known that of the alkali metal and ammonium fluorides, the order of activity as fluorinating agents will be: $KF > NaF > NH_4F$. Likewise, KF is generally more active than $KHF_2$. Since it has been reported that potassium acid fluoride and ammonium fluoride will only form partial fluorination products, it would clearly be expected that ammonium bifluoride would be a poorer fluorinating agent than either of ammonium fluoride or potassium acid fluoride in the fluorination of sulfuryl chloride. The reverse is true in the instant invention.

Ammonium bifluoride is derived from waste fluorosilicic acid which is produced in large quantities during the extraction of phosphoric acid from phosphate rock. The present invention, in addition to providing a more economical and simpler route to sulfuryl fluoride, also provides an outlet for productive utilization of fluoride, disposal of which is increasingly becoming a pollution problem.

In accordance with the present invention, sulfuryl fluoride is produced by a process which comprises reacting a sulfuryl compound such as sulfuryl chloride, sulfuryl bromofluoride or sulfuryl chlorofluoride with ammonium bifluoride at a temperature above the boiling point of said sulfuryl compound reactant.

Temperatures within the range of about 30° C. to about 220° C. will be sufficient to effect reaction and produce some sulfuryl fluoride. We have found, however, that formation of partial fluorination products, for example, sulfuryl chlorofluoride when sulfuryl chloride is the reactant is favored at temperatures below the boiling point of this reactant, e.g. 69° C., and therefore are to be avoided. The preferred temperature for the instant reaction is therefore above about 69° C. and most preferably, is from about 90° C. to about 150° C.

While sub- or superatmospheric pressures may be employed, the invention affords the advantage of operation at atmospheric pressure and such is preferred herein.

Sulfuryl compounds suitable for use as reactants include sulfuryl chloride, sulfuryl bromofluoride and sulfuryl chlorofluoride. Of these, sulfuryl chloride is the preferred reactant and will be used for purposes of illustration hereinafter.

The reactants may be employed in equimolar proportions or an excess of either reactant may be employed. It is preferred to employ a three-fold excess of ammonium bifluoride to prevent formation and evolution of acid gases.

For example, when either an equimolar or two-fold excess of ammonium bifluoride is employed, HCl or HF gases are produced as in:

(1) 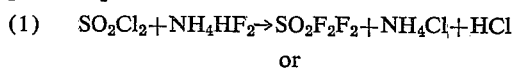

or (2) 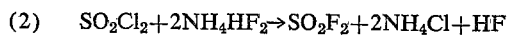

In the preferred embodiment:

(3) 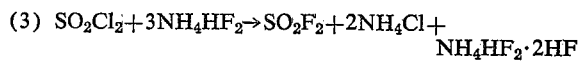

Formation of acid gases is avoided via reaction (3) with formation of a liquid complex formed from ammonium bifluoride and hydrogen fluoride.

It will be understood, however, that formation of such gases is not detrimental to the successful operation of the instant process. Prevention of their formation is merely considered herein in light of the current desire to eliminate, where possible, unnecessary evolution of potential pollutants.

Reaction between the reactants may be effected in any of various ways as desired. Ammonium bifluoride (anhydrous) may be added as a solid or as a liquid melt above its melting point, e.g. above 126° C. The sulfuryl compound reactant, for example, sulfuryl chloride, may be added thereto as liquid or vapor or the two reactants may be mixed in the cold and progressively heated to effect reaction, with or without agitation. In yet another alternative, solid ammonium bifluoride may be placed in a vessel in the presence of a high boiling inert liquid, for example, an aromatic hydrocarbon or halo-hydrocarbon such as trichlorobenzene, chlorotoluene, etc. and sulfuryl chloride passed to the vessel as a liquid or as a vapor below the surface of said high boiling liquid containing ammonium bifluoride.

The preferred practice of the invention is to add vaporized sulfuryl chloride liquid to a reactor containing molten ammonium bifluoride in the absence of solvent. The reactor and other equipment employed may be made of, e.g. nickel, Monel, Inconel or other material corrosive-resistant to reactants and the products formed.

The product, principally sulfuryl fluoride, leaves the reactor as a vapor and can be collected in a suitably-cooled trap or condenser employing procedures well known in the art. Some sulfuryl chlorofluoride and/or chlorine and sulfur dioxide decomposition products may also be present. Such products may likewise be recovered and, in the case of sulfur dioxide and chlorine, recombined for use in subsequent formation of sulfuryl fluoride.

The following example is given to illustrate the invention:

EXAMPLE

A Monel reactor, equipped with a Monel, water-cooled reflux condenser and a stainless steel stirring blade was charged with 71 parts of ammonium bifluoride which was stirred vigorously under vacuum to remove any residual moisture at 93° C. for about 1 hour. 140 parts of sulfuryl chloride was added dropwise over a two-hour period at a temperature maintained within the range of about 127° to 145° C. Gaseous products were condensed in a stainless steel trap. At the end of the two hour period, 115 parts of liquid was collected in the trap which upon distillation and gas chromatography analysis was found to contain 61 parts sulfuryl fluoride, 17 parts of chlorine and about 29 parts sulfur dioxide. This represents a yield of sulfuryl fluoride of 59% based on sulfuryl chloride charged.

When either of sulfuryl chlorofluoride or sulfuryl bromofluoride are substituted in the above example, comparable yields of sulfuryl fluoride are obtained.

We claim:
1. A process for the preparation of sulfuryl fluoride which comprises reacting a sulfuryl compound selected from the group consisting of sulfuryl chloride, sulfuryl bromofluoride and sulfuryl chlorofluoride with ammonium bifluoride at a reaction temperature above the boiling point of said sulfuryl compound.
2. A process as claimed in claim 1 wherein said sulfuryl compound is sulfuryl chloride.
3. A process as claimed in claim 2 wherein said temperature is within the range of about 90° C. to about 150° C.
4. A process as claimed in claim 3 wherein a three-fold excess of said ammonium bifluoride is employed.
5. A process as claimed in claim 1 wherein sulfuryl fluoride is recovered from the gaseous product thus produced.
6. A process for the preparation of sulfuryl fluoride which comprises reacting sulfuryl chloride with ammonium bifluoride at a temperature within the range of about 90° C. to 150° C. and recovering sulfuryl fluoride from the gaseous product thus produced.

References Cited

UNITED STATES PATENTS

| | | | |
|---|---|---|---|
| 2,562,432 | 7/1951 | McCann et al. | 23—203 R |
| 2,772,144 | 11/1956 | Belf | 23—203 R |
| 3,092,458 | 6/1963 | Ruh et al. | 23—203 R |
| 3,320,030 | 5/1967 | Bisignani et al. | 23—203 R |

EARL C. THOMAS, Primary Examiner

PO-1050
(5/69)

UNITED STATES PATENT OFFICE
CERTIFICATE OF CORRECTION

Patent No. 3,687,626          Dated August 29, 1972

Inventor(s) Cyril Woolf and Richard O. Michael

It is certified that error appears in the above-identified patent and that said Letters Patent are hereby corrected as shown below:

Column 1, line 4, "Woole" should read -- Woolf --.

Signed and sealed this 23rd day of January 1973.

(SEAL)
Attest:

EDWARD M. FLETCHER, JR.          ROBERT GOTTSCHALK
Attesting Officer          Commissioner of Patents